(12) United States Patent
Lu et al.

(10) Patent No.: US 8,074,232 B2
(45) Date of Patent: Dec. 6, 2011

(54) METHOD FOR IMPROVING THE COMMUNICATION OF THE HUMAN INTERFACE DEVICE

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 1126 days.

(21) Appl. No.: 11/850,200

(22) Filed: Sep. 5, 2007

(65) Prior Publication Data

US 2008/0066088 A1 Mar. 13, 2008

(30) Foreign Application Priority Data

Sep. 7, 2006 (CN) .......................... 2006 1 0113011

(51) Int. Cl.
*G06F 9/44* (2006.01)
*G06F 13/20* (2006.01)
*G06F 13/38* (2006.01)

(52) U.S. Cl. ............ 719/327; 710/62; 710/63; 710/260; 710/313

(58) Field of Classification Search .................. 719/310, 719/321, 327; 710/62, 63, 100, 260, 313
See application file for complete search history.

(56) References Cited

U.S. PATENT DOCUMENTS

| 6,085,265 | A * | 7/2000 | Kou | 710/63 |
| 6,311,228 | B1 * | 10/2001 | Ray | 719/321 |
| 7,290,072 | B2 * | 10/2007 | Quraishi et al. | 710/105 |
| 7,886,353 | B2 * | 2/2011 | Avraham et al. | 726/14 |
| 2006/0218409 | A1 * | 9/2006 | Avraham et al. | 713/189 |

* cited by examiner

*Primary Examiner* — Van Nguyen
(74) *Attorney, Agent, or Firm* — Hammer & Associates, P.C.

(57) ABSTRACT

A method for improving the communication of the human interface device, comprising reporting at least one interrupt input endpoint and at least one interrupt output endpoint to the host; specifying that the USB device has a report descriptor in the HID class descriptor; specifying an input report and an output report in the report descriptor; and receiving an instruction from the host through the bulk output endpoint by the USB device, and returning the result from the USB device to the host through the bulk input endpoint, in which the size of the data transferred between the USB device and the host each time is equal to that of the corresponding report to increase the communication speed of the Universal Serial Bus (USB) device, which is designed to work as an HID.

4 Claims, 2 Drawing Sheets

METHOD FOR IMPROVING THE COMMUNICATION OF THE HUMAN INTERFACE DEVICE

FIELD OF THE INVENTION

The present invention relates to a method for improving the communication of the human interface device.

BACKGROUND OF THE INVENTION

Generally, a USB device works with a driver, which provides a data transfer channel from the application to the device. However, to develop an error-free driver is very complicated. Any problem with the driver might lead to a system crash. For this reason, the operating system is designed to provide built-in drivers to some typical USB devices, such as the Human Interface Device (HID) like mouse and keyboard. Therefore, if the non-typical USB devices, such as the USB Key, are designed as a human interface device, they can directly utilize the built-in drivers of the operating system, eliminating the complexity of design of drivers and related risks.

For the HID driver of the operating system, there are two approaches to access to the hardware device: Control Transfers and Interrupt Transfers, as defined by the USB Specification. Both Control Transfers and Interrupt Transfers are designed to best support trickle data transfers. The USB device as a human interface device cannot conduct bulk and high-speed data communication. When working on bulk data, the USB device as a human interface device cannot perform high-speed communication because the capacity of Interrupt Endpoint Buffers is not large enough.

In the USB Specification, Bulk Transfers are defined for bulk and high-speed data communication. Generally, the capacity of the buffers for Bulk Transfers is relatively large in the chip used by the USB device. But the HID class device cannot use the communication means of Bulk Transfers.

The chip with a USB interface has circuitries for various data transfer means inside. Each data transfer means corresponds to a circuitry, which is also referred to as "endpoint". The endpoint that supports control transfers is named as the control endpoint. The endpoint that supports interrupt transfers is named as the interrupt endpoint. The endpoint that supports bulk transfers is named as the bulk endpoint.

When connected to a host, the USB device sends a set of data to the host. The set of data declares the type of the device and the supported data transfer means. The host recognizes the USB device through the descriptor (i.e. the set of data). Each descriptor contains the information of a device or one of its components. All USB peripherals must respond to the request for standard USB descriptors. The host requests the descriptor to the device through control transfers during enumeration.

The descriptors referenced by the present invention are:
The interface descriptor. It defines an interface between a USB device and a host, and indicates if the device is a human interface device and has any endpoint other than the control endpoint etc. The endpoint descriptor. It is required only if the device has any endpoint other than the control endpoint. It indicates the type of the endpoint, the address of the endpoint in the chip, the size of the endpoint's buffer, and the interval of the host's access to the endpoint.
The HID class descriptor. It is required only if the device is defined as a human interface device. It indicates the version number of the USB protocol supported by the device. It also indicates that if the device has private descriptors and the feature limitation to the private descriptors.
The report descriptor. It is required only if the device is defined as a human interface device. It indicates how the data is to be organized during the communication between the device and the host.

SUMMARY OF THE INVENTION

When the USB device is designed to work as a human interface device, to exchange data in a higher speed between the device and the host, the present invention provides a method that uses the bulk endpoint to simulate the interrupt endpoint making use of the larger buffer of the bulk endpoint to improve the communication speed of bulk of data.

The present invention provides a method for improving the communication of the human interface device, comprising the steps of:
1) setting Number of Endpoints to a value that is equal to or greater than 2 and setting Device Category to 3 in the interface descriptor;
2) reporting at least one interrupt input endpoint and at least one interrupt output endpoint to the host, the address of the interrupt input endpoint is set to the address of the bulk input endpoint in the USB device, and the address of the interrupt output endpoint is set to the address of the bulk output endpoint in the USB device;
3) specifying that the USB device has a report descriptor in the HID class descriptor;
4) specifying an input report and an output report in the report descriptor, the size of the input report and the output report is greater than or equal to the capacity of the buffer of the bulk endpoint;
5) receiving an instruction from the host through the bulk output endpoint by the USB device and returning the result from the USB device to the host through the bulk input endpoint, the size of the data transferred between the USB device and the host each time is equal to that of the corresponding report.

In above method, the process of receiving and handling the instruction and data from the host comprises the steps of:
1) determining if the bulk endpoint is to transfer data;
2) reorganizing the data by the USB device when the bulk endpoint is to transfer the data;
3) executing the instruction by the USB device;
4) returning the result and status from the bulk endpoint.

The present invention provides a method to simulate the bulk endpoint to the interrupt endpoint to significantly increase the communication speed of the USB device which is designed to work as a human interface device when transferring bulk of data.

BRIEF DESCRIPTION OF THE DRAWINGS

The present invention may be further understood from the following description in conjunction with the appended drawings. In the drawings.

DETAILED DESCRIPTION OF THE PREFERRED EMBODIMENTS

The present invention is further described with the embodiments in conjunction with the appended drawings below.

The method of the present invention involves changes to the setting of descriptors and data organizing.

1. Setting of Descriptors 1.1 The Interface Descriptor

The present invention involves the setting of descriptors that set Number of Endpoints to a value that is equal to or greater than 2; and set Device Category to 3, which indicates that the device is an HID class device.

1.2 The Endpoint Descriptor

It is necessary to report two interrupt endpoints to the host for the present invention. To do so, two endpoint descriptors are added, which correspond to the two interrupt endpoints. The two interrupt endpoints are the interrupt input endpoint and the interrupt output endpoint separately. Set Endpoint Type to 3 to indicate the endpoint is an interrupt endpoint. Set Endpoint Numbers to the values that are identical to those of the bulk input and bulk output endpoints in the chip of the USB device. Set Buffer Sizes for the interrupt input endpoint and the interrupt output endpoint both to 64 bytes. Set the interval of the host's access to the interrupt input endpoint and the interrupt output endpoint to 1 ms.

For various embodiments, the number of the interrupt endpoints may be more than 2. But there must be at least one interrupt input endpoint and at least one interrupt output endpoint.

1.3 The HID Class Descriptor

When setting the HID class descriptor, specify that the HID spec v1.10 or above is supported, and the device has a report descriptor, whose size is 58 bytes.

1.4 The HID Report Descriptor

Define an input report which is transmitted from the device to the host and an output report which is transmitted from the host to the device. The size of the input report and the output report is equal to or greater than the capacity of the buffer of the bulk endpoint.

2. Data Organizing

The data transferred between the USB device and the host each time is 64 bytes (equal to the size of the report). If the data size is more than 64 bytes, the data is divided into a series of data blocks, which have a size of 64 bytes, before its transmission. The receiver then combines the data blocks to generate complete data.

In the 64 bytes of each report, the first 6 bytes are used to indicate the relationship between the report and the integral data block. The remaining 58 bytes are meaningful data. In the first 6 bytes, the first two indicate the size of all data. The $3^{rd}$ ad $4^{th}$ bytes indicate the size of applicable data of this report. The last two bytes indicate the offset location of the report data in all data.

Figure 1:
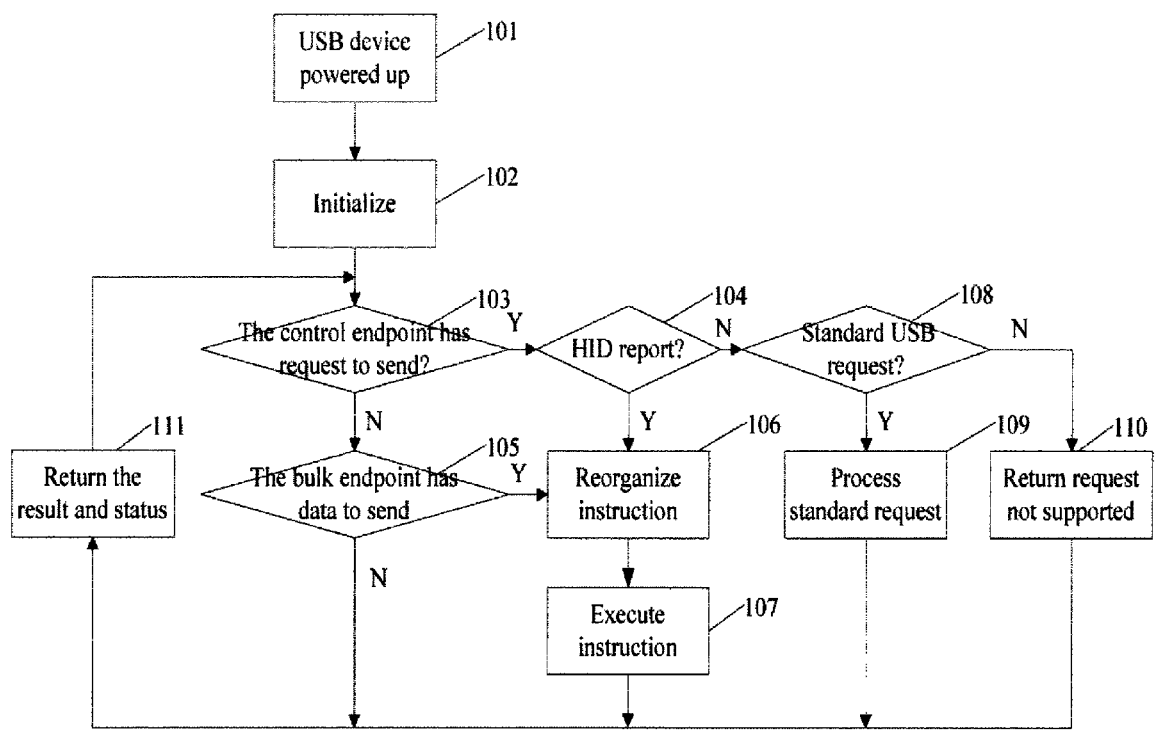
FIG. 1 is a schematic of receiving the data and instruction from the host to the device.

Referring to FIG. 1, the instruction and data are received as follows:

Step 101, the USB device is powered up;

Step 102, the USB device initializes;

Step 103, determine if the control endpoint has any request to send; if so, go to Step 104; else, go to Step 105;

Step 104, determine if the report is an HID report; if so, go to Step 106 to reorganize the instruction for executing in Step 107, then go to Step 111 to return the result and status by the control endpoint in Step 111, and finally go to Step 103 to wait for the control endpoint to send request again; else, go to Step 108;

Step 105, determine if the bulk endpoint has data to send; if so, go to Step 106 to reorganize the instruction for executing in Step 107, then go to Step 111 to return the result and status by the bulk endpoint, and finally go to Step 103 to wait for the control endpoint to send request again; else, go to Step 111 to return the result and status, then go to Step 103 to wait for the control endpoint to send request again;

Step 108, determine if the request sent from the host is a standard USB request; if so, go to Step 109 to process the request; else, go to Step 110 to return request not supported message;

After Step 109 and 110 executed, go to Step 111 to return the result and status, and finally go to Step 103 to wait for the control endpoint to send request.

In above procedure, Step 103 and 104 are provided only for compatible considerations for the USB device. These steps are optional in practice.

Also in practice, if the USB device communication does not refer to bulk data transfer, the Step 106 could be ignored, the next step is still applicable.

Figure 2:
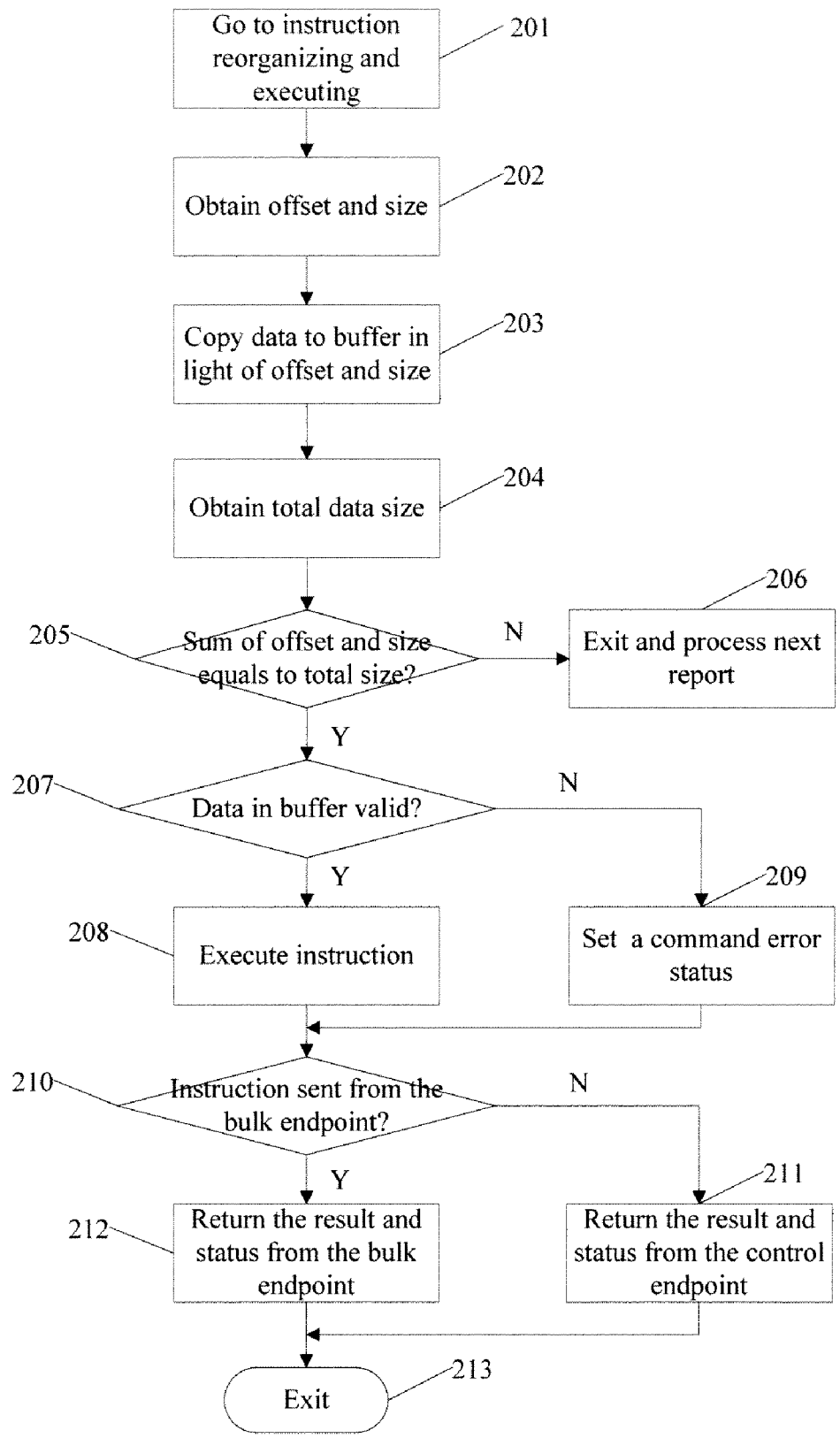
FIG. 2 is a schematic of handling the instruction and returning the result from the device to the host.

Referring to FIG. 2, the instruction is executed and the result is returned as follows:

Step 201, the USB device goes into instruction reorganizing and executing status;

Step 202, the USB device obtains data offset and size;

Step 203, the USB device copies data to the buffer of the bulk endpoint in light of data offset and size;

Step 204, the USB device obtains the total size of the data;

Step 205, the USB device determines if the sum of the offset and the data size is equal to the total data size; if not, go to Step 206 to exit from instruction reorganizing and executing status, and process the next report; else, go to Step 207;

Step 207, the USB device determines if the data in the buffer of the bulk endpoint is valid; if not, go to Step 209 to set a command error status and to Step 210; else, go to Step 208;

Step 208, the USB device executes the instruction, such as Select a File;

Step 210, determine if the instruction is sent from the bulk endpoint; if so, return the result and status from the bulk endpoint in Step 212; else, return the result and status from the control endpoint in Step 211;

Step 213, exit and go into another command cycle.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

The invention claimed is:

1. A method for improving the communication of a human interface device (HID), comprising the steps of:

1) setting Number of Endpoints to a value that is equal to or greater than 2 and setting Device Category of a Universal Serial Bus (USB) device to 3 in an interface descriptor;

2) reporting at least one interrupt input endpoint and at least one interrupt output endpoint to a host, wherein an address of the interrupt input endpoint is set to an address of a bulk input endpoint in the USB device, and an address of the interrupt output endpoint is set to the an address of a bulk output endpoint in the USB device;

3) specifying that the USB device has a report descriptor in an HID class descriptor;

4) specifying an input report and an output report in the report descriptor, wherein the size of the input report and the output report is greater than or equal to the capacity of a buffer of the bulk endpoint;

5) receiving and handling an instruction from the host through the bulk output endpoint by the USB device and returning the result from the USB device to the host through the bulk input endpoint, wherein the size of the data transferred between the USB device and the host each time is equal to that of the corresponding report, wherein the process of receiving and handling the instruction and data from the host comprises the steps of: a) determining if the bulk endpoint is to transfer data; b) reorganizing the data by the USB device when the bulk endpoint is to transfer the data; c) executing the instruction by the USB device; and d) returning the result and status from the bulk endpoint.

2. The method of claim 1, wherein the buffer size of each of the interrupt input endpoint and the interrupt output endpoint is 64 bytes.

3. The method of claim 1, wherein the data transferred between the USB device and the host each time is in the size of 64 bytes, in light of the size of the report; for the data that has a size of more than 64 bytes, the data is divided into a plurality of 64-byte data blocks, which are combined to generate the data on the receiver side.

4. The method of claim 1, wherein the process of Step 1) and 2) comprises the steps of: a) the USB device going into instruction reorganizing and executing status; b) the USB device obtaining data offset and size; c) the USB device copying data to the buffer of the bulk endpoint in light of the offset and size; d) the USB device obtaining the total size of the data; e) the USB device determining if the sum of the offset and the data size is equal to the total data size; if it is, skip the next step and go to the last step; else, proceed normally; f) the USB device exiting from instruction reorganizing and executing status, and processing the next report; g) the USB device determining if the data in the buffer of the bulk endpoint is valid; if it is invalid, a command error status is set and returning the result and status from the bulk endpoint; else, executing the instruction by the USB device.

* * * * *